US009069962B2

(12) United States Patent
Bu et al.

(10) Patent No.: US 9,069,962 B2
(45) Date of Patent: Jun. 30, 2015

(54) EVALUATION OF A FAST AND ROBUST WORM DETECTION ALGORITHM

(71) Applicant: ALCATEL-LUCENT USA INC., Murray Hill, NJ (US)

(72) Inventors: Tian Bu, Edison, NJ (US); Aiyou Chen, New Providence, NJ (US); Scott Alan Vander Wiel, Fanwood, NJ (US); Thomas Woo, Short Hills, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/096,145

(22) Filed: Dec. 4, 2013

(65) Prior Publication Data

US 2014/0181978 A1   Jun. 26, 2014

Related U.S. Application Data

(63) Continuation of application No. 11/395,053, filed on Mar. 31, 2006, now abandoned.

(51) Int. Cl.
G06F 21/56 (2013.01)
H04L 29/06 (2006.01)

(52) U.S. Cl.
CPC .......... G06F 21/561 (2013.01); H04L 63/1425 (2013.01); H04L 63/145 (2013.01)

(58) Field of Classification Search
CPC .............. H04L 63/145; H04L 63/1425; H04L 63/1416; H04L 63/1433

USPC ..................................................... 726/22–26
See application file for complete search history.

(56) References Cited

U.S. PATENT DOCUMENTS

| | | | |
|---|---|---|---|
| 7,363,656 B2 * | 4/2008 | Weber et al. | 726/23 |
| 7,627,899 B1 * | 12/2009 | Tripathi et al. | 726/25 |
| 7,917,647 B2 * | 3/2011 | Cooper et al. | 709/233 |
| 8,176,527 B1 * | 5/2012 | Njemanze et al. | 726/2 |
| 2004/0025044 A1 * | 2/2004 | Day | 713/200 |
| 2004/0078592 A1 * | 4/2004 | Fagone et al. | 713/201 |
| 2004/0107321 A1 * | 6/2004 | Altman et al. | 711/147 |
| 2005/0066053 A1 * | 3/2005 | McDysan | 709/243 |
| 2006/0173992 A1 * | 8/2006 | Weber et al. | 709/224 |
| 2006/0173996 A1 * | 8/2006 | Bates et al. | 709/224 |
| 2006/0174341 A1 * | 8/2006 | Judge | 726/22 |
| 2006/0210942 A1 * | 9/2006 | Pace et al. | 433/8 |
| 2007/0143841 A1 * | 6/2007 | Kurakami et al. | 726/22 |
| 2008/0209521 A1 * | 8/2008 | Malaney | 726/4 |

* cited by examiner

*Primary Examiner* — Kambiz Zand
*Assistant Examiner* — Tongoc Tran
(74) *Attorney, Agent, or Firm* — Carlson, Gaskey & Olds, P.C.

(57) ABSTRACT

A method and computer product are presented for identifying Internet worm propagation based upon changes in packet arrival rates at a network connection. First, unsolicited (i.e., packets that were not requested by the receiver) traffic is separated from solicited traffic at the network connection. The unsolicited traffic arrival patterns are monitored and analyzed for any changes. Once changes in the unsolicited traffic arrival patterns are detected, the changes are mathematically analyzed to detect growth trends. The presence of growth trends that follow certain key characteristics indicate whether the changes are due to worm propagation.

7 Claims, 3 Drawing Sheets

```
WormDetection(T)
1.  S₀ = 0;
2   Initialize μ with the median of the first c₀ = 100
    observed inter-arrival time divided by log(2)
3.  For each new arrival Tᵢ, Xᵢ = Tᵢ − Tᵢ₋₁
4.      Sᵢ = max(0, Sᵢ₋₁ + μ − Xᵢ − ρμ)
5.      μ = (1 − w) · μ + w · Xᵢ
6.      If Sᵢ > 0
7.          If Sᵢ₋₁ = 0
8.              j = 0; n₀ = i; Sₘₐₓ = Sᵢ
9.          Else
10.             j = j + 1; Sₘₐₓ = max(Sₘₐₓ, Sᵢ);
11.         If Sᵢ < 0.8 · Sₘₐₓ, Sᵢ = 0
12.         If Sᵢ > h
13.             Estimate MLE of r̂ and se(r̂)
14.             from Tₙ₀ ... Tₙ₀₊ⱼ
15.             If (r̂ − r₀) > q_c · se(r̂)
16.                 Raise an alarm;
17.                 Skip estimate until CUSUM drop to zero;
18. EndFor
```

Figure 3

WormDetection(T)
1. $S_0 = 0$;
2. Initialize $\mu$ with the median of the first $c_0 = 100$ observed inter-arrival time divided by $\log(2)$
3. For each new arrival $T_i$, $X_i = T_i - T_{i-1}$
4. $\quad S_i = \max(0, S_{i-1} + \mu - X_i - p\mu)$
5. $\quad \mu = (1 - w) \cdot \mu + w \cdot X_i$
6. $\quad$ If $S_i > 0$
7. $\quad\quad$ If $S_{i-1} = 0$
8. $\quad\quad\quad j = 0; n_0 = i; S_{max} = S_i$
9. $\quad\quad$ Else
10. $\quad\quad\quad j = j + 1; S_{max} = max(S_{max}, S_i)$;
11. $\quad\quad\quad$ If $S_i < 0.8 \cdot S_{max}, S_i = 0$
12. $\quad\quad\quad$ If $S_i > h$
13. $\quad\quad\quad\quad$ Estimate MLE of $\hat{r}$ and $se(\hat{r})$
14. $\quad\quad\quad\quad$ from $T_{n_0} \ldots T_{n_0+j}$
15. $\quad\quad\quad\quad$ If $(\hat{r} - r_0) > q_c \cdot se(\hat{r})$
16. $\quad\quad\quad\quad\quad$ Raise an alarm;
17. $\quad\quad\quad\quad\quad$ Skip estimate until CUSUM drop to zero;
18. EndFor

Figure 4

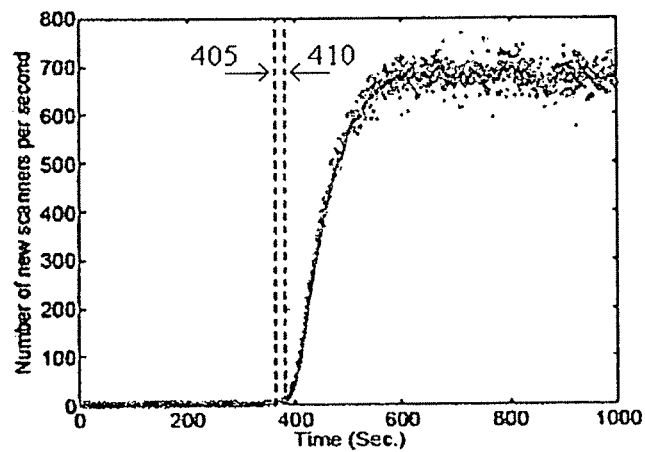

EVALUATION OF A FAST AND ROBUST WORM DETECTION ALGORITHM

FIELD OF THE INVENTION

The invention pertains to identification of Internet worm propagation.

BACKGROUND OF THE INVENTION

Malicious computer worms (or Internet worms) are a danger to any computer that is accessible via a computer network, such as the Internet. A computer worm is a self-replicating program, similar to a computer virus. However, unlike a virus, which attaches itself to and infects an executable file on a computer, a worm is self-contained and does not need to be part of another program to propagate itself.

Worms are often designed to exploit the file transmission capabilities of many computers. A worm uses a network to send copies of itself to other systems and it does so without any necessary human intervention, such as forwarding by email, which is a common method of spreading a virus. Scan-based worms use a form of scanning (transmission of packets) from an infected host to a potential new host as a propagation technique. Based on the potential host's response to this scan (i.e., does the potential host respond positively, or does the response indicate that the potential host will not accept additional packets from the infected host), the infected host determines whether to spread the worm to the potential host. It is also possible that a worm can be carried in a single packet. In this situation, the infected host transmits the packet to another address without the need for a response from the potential new host.

Typical approaches to preventing a worm outbreak involve worm detection, dissection and signature development. Signature development occurs once the worm has been identified, and a common pattern is found which can be used to identify the worm. This signature must then be propagated throughout the network, either to a firewall running security software or to each individually connected computer running a certain security program. Once the security program receives the signature, the database of signatures the security program recognizes as malicious is updated, and the computer running the security program is protected against the identified worm. But this approach does not address the case of previously unidentified worms for which no signature has been identified.

Previously unidentified, fast spreading worms are a reality, as amply demonstrated by worms such as the Stammer worm. The release and propagation of the Slammer worm in 2003 was a revolutionary event in the study of computer worm propagation. It not only demonstrated in an unprecedented way the scale and disruption that is possible in the real world with a relatively compact worm, it also showed the ineffectiveness of current techniques in detecting and countering these new fast spreading worms. More specifically, in the early phase of Slammer propagation, it doubled in size every 8.5 seconds. It reached a maximum scan rate of 55 million addresses per second and was able to infect more than 90 percent of vulnerable hosts within 10 minutes. In the end, even though Slammer carried no malicious payload and its main damage was in network resource (bandwidth and CPU) consumption, it served as a wake-up call to network administrators and the computer security industry.

With these kinds of fast spreading worms, the traditional approach of signature-based detection is no longer sufficient. Worms can infect all vulnerable hosts well before a signature can be identified. Several approaches have been proposed utilizing non-signature based detection means. One such approach detects a worm by monitoring the correlation between the incoming and outgoing packets at a network connection. More specifically, this approach studies the correlation of the payloads and packet headers of the incoming and outgoing packets. However, this correlation is not always reliable. Specifically, the technique was most effective against earlier worms that used a fixed destination port, or a portion of the network address specifying the port where the packet is received on the network connection, which made correlation studies easier as a single destination port could be monitored across the network. However, recent worm attacks randomize the destination port on the network connection. This renders monitoring of destination port incoming and outgoing packets and studying the correlation between the two packet types less reliable for worm detection.

Another non-signature based approach involves detecting a worm by identifying the exponential growth trend of scanning rates on a particular network connection. However, this process requires studying the growth trend over a given interval of time. Different worms have different propagation times. For example, a worm may inhabit a host computer for an hour before propagating to a new host. If the wrong interval of time is chosen to study the growth trend, then relevant information relating to the growth trend is missed and a worm cannot be effectively detected.

What is needed is a fast method to detect worms lacking known signatures. This method should be accurate and robust (i.e., it must quickly and accurately identify different propagation characteristics of different worms), and work quickly enough so that a worm can be detected at the inception of the worm spread, before its propagation hits its exponential growth rate.

SUMMARY OF THE INVENTION

In accordance with the principles of the present invention, a new worm detection technique is presented that utilizes a process to detect the outbreak of a new worm without knowing the signature of the worm. Changes in the traffic pattern of unsolicited packets are detected, and any changes in traffic patterns are analyzed to determine if they are consistent with changes in traffic associated with worm propagation. More specifically, traffic arrival patterns are monitored, primarily for unsolicited traffic, i.e., traffic coming into a computer network connection that was not first requested. Next, changes in the traffic patterns are analyzed. During this analysis, certain patterns of growth rates relating to the unsolicited traffic that are indicative of the presence of worm propagation are searched for, such as an exponential growth rate of unsolicited traffic from numerous senders. When such a pattern is detected, it is assumed that a worm is present so that measures can be implemented to halt its progress.

BRIEF DESCRIPTION OF THE FIGURES

FIG. 3 is a printout of a worm detection algorithm according to one embodiment of the present invention.

FIG. 4 is a graph illustrating the effectiveness of the algorithm of FIG. 3 in detecting the outbreak of the Slammer Worm.

DETAILED DESCRIPTION OF THE INVENTION

In accordance with the present invention, a non-signature based method for detecting Internet worms is presented. By monitoring and analyzing traffic patterns at a network connection, a worm can be detected.

Figure 1:
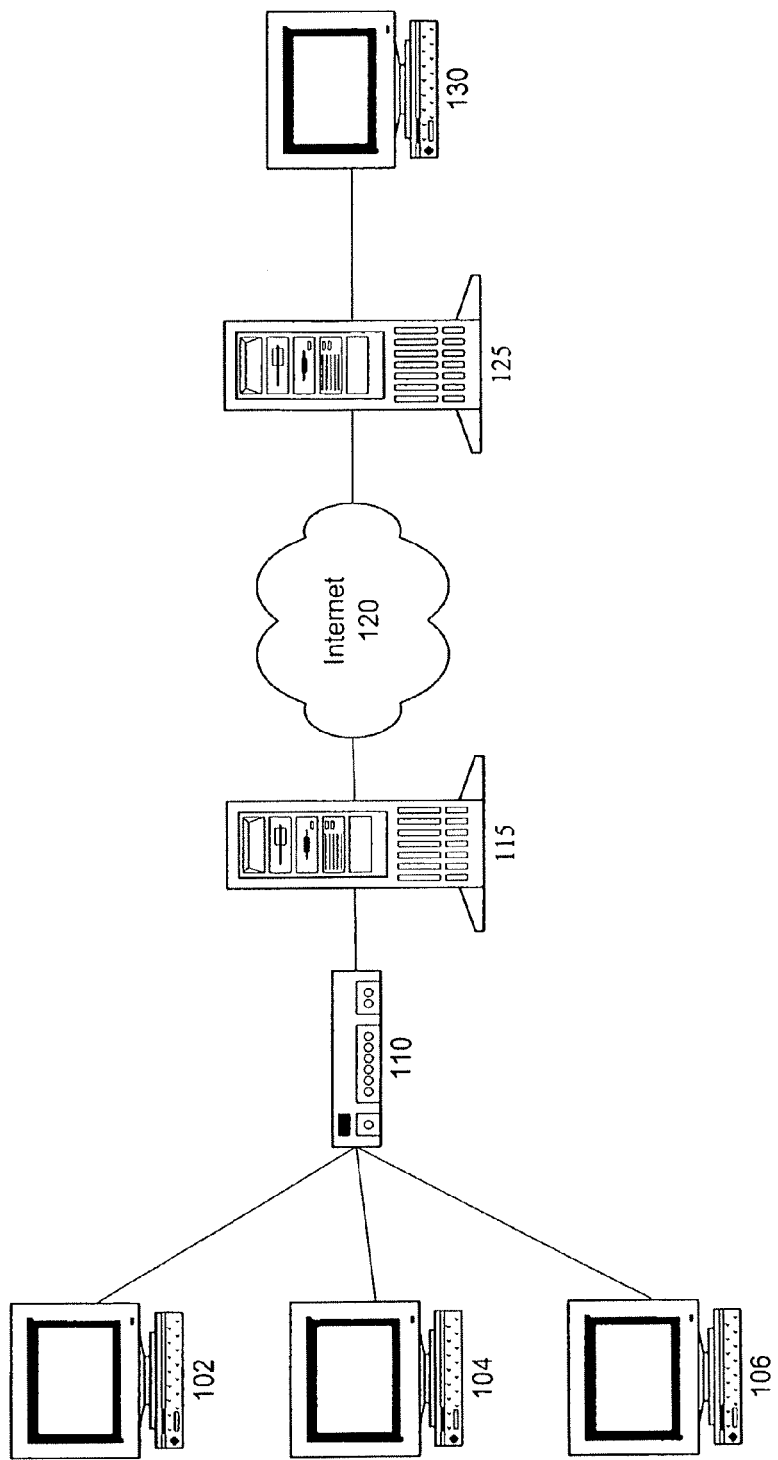
FIG. 1 is a diagram illustrating a basic computer network.

FIG. 1 illustrates a computer network 100. In this network, clients 102, 104 and 106 connect to the server 115 through router 110. Once connected to server 115, clients 102, 104 and 106 have access to Internet 120. Also connected to Internet 120 through server 125 is client 130. Router 110 is equipped with a firewall running security software intended to monitor network traffic, specifically the packets sent and received through the router, and identify and stop any malicious traffic. Clients 102, 104, 106 and 130 are also running a desktop security program for scanning individual packets sent to the client.

Conventional security software identifies malicious packets based on the signature of the packet, or a unique identifier for each packet. However, new worms are being designed which can infect millions of hosts well before a signature can be found. For example, client 130 is infected with a previously unidentified worm such that client 130 becomes a scanner, meaning the worm sends out a scan, which is a series of packets intended to poll a potential host computer. Client 130 scans clients 102, 104 and 106. Since the worm has no known signature, neither the firewall nor the desktop security program would recognize that the packets are malicious. If clients 102, 104 and 106 respond positively to the scan, client 130 passes the worm to clients 102, 104 and 106, and they become new hosts.

Figure 2:
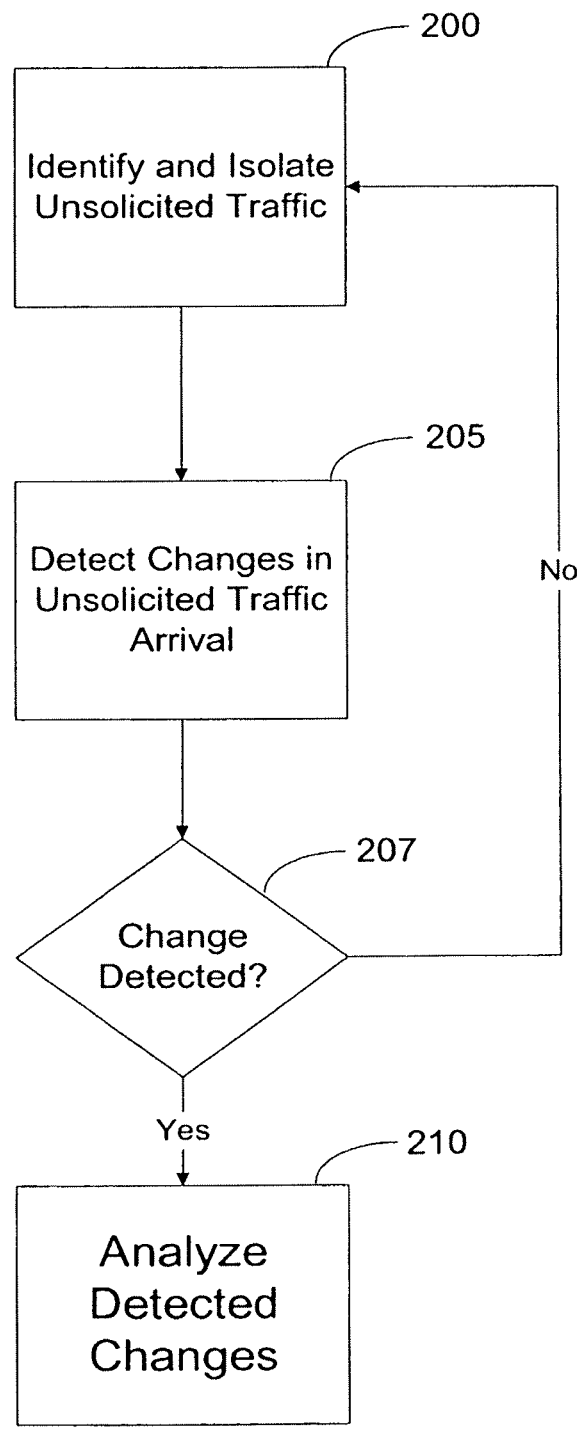
FIG. 2 is a flow chart illustrating a method in accordance with one particular embodiment of the invention.

FIG. 2 is a flow chart illustrating a worm detection method in accordance with the principles of the present invention. In Step 200, the unsolicited traffic being received at a specific network location is identified and isolated. Unsolicited traffic refers to network traffic that was not requested by a receiving computer. For example, the traffic at router 110 from FIG. 1 is monitored. This unsolicited traffic is isolated from the solicited traffic, to produce a traffic trace based only on the unsolicited packets received at the router.

The system now proceeds to step 205 where any changes in traffic arrival patterns are determined. Though all changes in traffic arrival patterns may not be due to worm propagation, worm propagation usually results in traffic arrival pattern changes with certain similar characteristics. As described in further detail below, the system uses cumulative summing, or CUSUM, a common statistical analysis tool used to detect changes in data sets, to study the arrival rates to determine any changes. CUSUM will detect a trend of increasing unsolicited packet arrival rate.

The process continues to decision step 207, in which, if CUSUM has detected a change in the arrival rates, the process continues to step 210. If CUSUM has failed to detect a change, flow returns to step 200.

If a change is detected in Step 205, the system proceeds to Step 210 where the changes are analyzed to determine if the changes are related to worm propagation. Specifically, the changes are analyzed to determine whether the changes have some exponential growth patterns in arrival rates. A Maximum Likelihood Estimation (MLE) is used to produce a non-stationary Poisson process and estimate its rate. Poisson processes are commonly used in statistical analysis to examine the number of times an event happens during a given time interval, where the probability for the event occurring is constant with respect to time. An alarm will trigger when the MLE yields a significant increase in propagation rate with a high level of confidence.

Steps 205 and 210 are further explained herein below. In step 205, first the inter-arrival times of the unsolicited packets are determined. $T_n$ denotes the arrival time of the n-th unsolicited packet in a t-sample (a sample taken at most once every t seconds), and $X_n = T_n - T_{n-1}$ is the inter-arrival time where $T_0 = 0$. It is assumed that the inter-arrival times $\{X_n: 1 \leq n < n_w\}$ before the worm starts are independently and identically distributed with mean $\mu$, where $T_{n_w}$ represents the time of the first worm scan. After a worm arrives, the inter-arrival times $\{X_n: n_w \leq n < \infty\}$ should have a decreasing mean that is less than $\mu$. This shift in the distribution of inter-arrival times may be considered a change point in statistical terms and CUSUM is designed for detecting changes from one distribution to another such as this change in inter-arrival times.

The CUSUM scheme can be applied as follows. Set $S_0 = 0$ and define $$S_n = \max(0, S_{n-1} + \mu - X_n - p\mu), n = 1, 2, \ldots$$

where p is dependant on the expected drop in mean inter-arrival times due to a worm. Typically, $p\mu$ is set to about half the size of the drop in mean inter-arrival time that is crucial to detect a change in arrival rates quickly. A change of inter-arrival time is signaled whenever $S_n$ exceeds a certain threshold h. The theory behind CUSUM is that, if the mean of $X_n$ shifts from $\mu$ to something smaller than $\mu - p\mu$ at sample $n_w$ then $S_n$ will tend to accumulate positive increments after $n_w$ and thus eventually cross the threshold h and signal a change. In practice, $\mu$ is not known, as arrival times can vary due to network conditions; but an estimate, such as an Exponentially Weighted Moving Average (EWMA) can be used in its place. The EWMA is based on the median of an initial sample of inter-arrival times.

Choosing the threshold parameter, h, requires trading off between detection delay (i.e., sensitivity) and the false detection rate. Small values of h provide quick detection when changes are present but also give more false alarms. The threshold h can be calculated from the expected time between false alarms, known as the Average Run Length (ARL) in quality control.

As seen in the flowchart, the CUSUM process used in step 205 is not used to directly trigger a worm alarm, but only as a first stage toward worm detection. As previously noted, if the CUSUM value Sn exceeds threshold h, the process proceeds to step 210 in which the detected changes are analyzed and a worm propagation model is estimated. However, if a new worm outbreak is in progress, it is probable that some time has elapsed between the outbreak and the CUSUM signal. When step 205 detects an unusual increase in unsolicited network traffic, there are three relevant cases that this increase might indicate. Let $T_{n_0}$ denote the most recent time (prior to the current signal) when the CUSUM transitioned from a value of 0 to a positive value. If a worm exists, its arrival is most likely earlier than $T_{n_0}$ (hereinafter Case 1). However, it is possible for a worm to arrive between $T_{n_0}$ and the CUSUM signaling time (hereinafter Case 2). This happens rarely and the lag between worm infection and the CUSUM signal transitioning from 0 to a positive value will most likely be small, e.g., on the order of second. Of course, it is also possible that no worm exists (hereinafter Case 3), which statistically is the most likely case. Let us first focus on the statistical estimation of the worm propagation model based on Case 1. It will be shown below that this also includes Case 3 and also serves as a good approximation for Case 2.

Scanner arrivals in a t-sample before a worm outbreak are well-modeled as a Poisson process with rate b(t) that changes slowly with time. Scanners that arise from a fresh worm outbreak can be modeled as a non-stationary Poisson process with rate:

$$\lambda(t) = ae^{r(t-t_w)} I(t \geq t_w)$$

where $t_w$ is the time when the first worm scan arrives; a is the expected number of worm scanner arrivals in the first second; r is the exponential propagation rate; and I(x) is an indicator function having value 1 when x is true and 0 otherwise. It is assumed that any background scanners (non-malicious scanners) and the ones caused by a new worm are independent. The superposition of background and worm scanners is thus modeled as a non-stationary Poisson process with rate:

$$\lambda(t) = b(t) + ae^{r(t-t_w)}I(t \geq t_w).$$

Because the background traffic is approximately stationary, its rate b(t) can be estimated easily using local averaging. Propagation characteristics are described by the parameters a and r that depend on the efficiency of the worm and the size of the network being monitored. Although a is not identifiable (i.e., cannot be estimated statistically) when $t_w$ is unknown, the exponential rate r is identifiable. A worm alarm is triggered when the data indicates with high confidence that r is significantly higher than a small tolerable rate $r_0$.

For simplicity, assume that the worm starts at 0 (i.e., $t_w=0$), unsolicited scanners arrive at times $T_1, T_2, \ldots$ according to a Poisson process with rate $\lambda(t)=b+ae^{rt}$, $t \geq 0$, and the corresponding CUSUM sequence S1, S2, ... remains below the threshold h until some arrival $T_{n0}$ ($n0 \geq 1$) when the CUSUM exceeds h and therefore causes flow to proceed to step 210 in which the change is to be further analyzed.

With respect to step 210, let us define $\overline{T}_j = T_{n0+j} - T_{n0}$ for j=1, 2, ..., n, where $\overline{T}_n$ is the current arrival relative to the signaling time $T_{n0}$. Note that we can only observe $\overline{T}_1, \ldots, \overline{T}_n$ and not the complete stream of arrivals $T_1, \ldots T_{n0}, T_{n0+1}, \ldots, T_{n0+n}$ because the worm outbreak time $t_w=0$ is not generally known. Thus, any estimators of a and r must be based on $(\overline{T}_1, \ldots, \overline{T}_n)$, the distribution depends on the unknowns $n_0$ and $T_{n0}$. The following theorem and its corollary demonstrate that the r can be estimated from the $\overline{T}_j$, but a cannot.

Theorem 1.

Let $T_1, T_2, \ldots$ denote consecutive arrival times from a Poisson process with positive rate $\lambda(t) = b + ae^{rt}$ beginning at $t=0$. Define $\overline{T}_j = T_{n0+j} - T_{n0}$ for j=1, 2, ... and for some $n_0 \geq 1$. Then, given $T_{n0}=t_0$, the relative times $\overline{T}_1, \overline{T}_2, \ldots$ are arrivals from a Poisson process with rate $\overline{\lambda}(t) = b + \overline{a}e^{rt}$, $t \geq 0$, where $\overline{a} = ae^{\hat{}}(rt_0)$.

Corollary 1.

Under the conditions of Theorem 1 and assuming that a>0, the parameters $\overline{a}$, b and r are identified by the data $(\overline{T}1, \ldots, \overline{T}n)$ for $n \geq 3$ but the parameter a is not identified unless $t_0$ is known.

The exception a=0 corresponds to no worm and in this case the propagation rate r has no meaning. Fortunately, for the purpose of worm detection, r is the most interesting parameter and it can be estimated by maximum likelihood inference as discussed next.

Let $\overline{\Lambda}(t) = \int_0^t \overline{\lambda}(s)ds$. Then the normalized arrival times $\overline{\Lambda}(\overline{T}_1), \overline{\Lambda}(\overline{T}_2), \ldots$ follow a stationary Poisson process with rate 1. Let $\ln(r, \overline{a}) = \log p(\overline{T}_1, \ldots, \overline{T}_n | T_{n0}=t_0)$ be the log-likelihood function for the $\overline{T}_j$'s conditional on $T_{n0}$. By the density transformation formula $$l_n(r, \overline{a}) = \sum_{j=1}^n \log \overline{\lambda}(\overline{T}_j) - \overline{\Lambda}(\overline{T}_n)$$

$$= \sum_{j=1}^n \log(b + \overline{a}e^{r\overline{T}_j}) - \left\{b\overline{T}_n + \frac{\overline{a}}{r}(e^{r\overline{T}_n} - 1)\right\},$$

the maximum likelihood estimates (MLE) are defined as $$(\hat{r}, \hat{\overline{a}}) = \arg \max l_n(r, \overline{a}).$$

Let $\theta = (r, \overline{a})^T$ and $\hat{\theta} = (\hat{r}, \hat{\overline{a}})^T$. Denote $\ln(\theta) = \ln(r, \overline{a})$. Then the MLE $\hat{\theta}$ has positive properties as summarized in Theorem 2 below.

Theorem 2.

Under the conditions of Theorem 1, if θ is bounded, then as $n \to \infty$, $$\hat{\theta} \to \theta,$$

in probability and $$\sqrt{n}(\hat{\theta} - \theta) \to N(0, I(\theta)^{-1}),$$

in distribution where I(θ) is the information matrix, $$I(\theta) = \lim_{n \to \infty} -E\left[\frac{1}{n} \frac{\partial^2}{\partial \theta \partial \theta^T} l_n(\theta)\right],$$

and can be estimated consistently by $$\hat{I} = -\frac{1}{n} \frac{\partial^2}{\partial \theta \partial \theta^T} l_n(\hat{\theta}).$$

The MLE $\hat{r}$ and its estimated asymptotic variance are used repeatedly in the second stage to test whether r is significantly positive. In particular, r>r0 is tested against r≤r0, where r0 (say 0.0001) is the maximal rate that can be ignored. Let se($\hat{r}$) be the asymptotic standard error of $\hat{r}$, that is, $$se(\hat{r}) = \sqrt{[\hat{I}^{-1}]_{11}/n}.$$

Since $Z_n \equiv (\hat{r} - r_0)/se(\hat{r})$ is asymptotically normally distributed with mean 0 and variance 1 under the null hypothesis $r = r_0$, the second stage declares a worm outbreak when $Z_n > q_c$, where $q_c$ is a threshold such as the 99.99 percentile of the standard Normal distribution. For example $q_c = 3.8$ is the 99.99% quantile of the Normal distribution.

In most CUSUM monitoring applications, the CUSUM statistic is reset to zero after a signal is triggered. In the present algorithm, however, a large CUSUM is required for the step 210 of FIG. 2 to operate. Hence, the CUSUM is not reset immediately upon crossing the threshold h, rather the reset occurs only after a substantial downward trend is seen following the trigger. The algorithm identifies a downtrend if the current CUSUM value is, for example, less than 80% of the maximum value recorded since the previous reset.

Although scanner arrivals, for the most part, resemble a locally stationary Poisson process, outliers do occasionally occur in arrival traces. These are cases in which the inter-arrival time between scanners is abnormally large for one reason or another. These outliers never trigger a false alarm because the MLE does not yield a large r in step 210. However, the outliers can easily lead to a CUSUM signal and thus needlessly trigger the MLE computations.

To reduce the impact of outliers in creating such false alarms, the algorithm may implement the following random tail-draw technique. Let $\mu_{n-1}$ be the most recent exponentially weighted moving average (EWMA) estimate of $E(X_n)$. If $X_n$ lies outside of the 0.01% and 99.99% percentiles of the exponential($\mu_{n-1}$) distribution, then it is replaced with a random draw $\hat{X}_n$ from the corresponding distribution for the purpose of calculating $S_n$.

FIG. 3 shows an exemplary worm detection algorithm in accordance with principles of the present invention. This algorithm corresponds to steps 205-210 in FIG. 2. Line by line, the algorithm proceeds as follows. Lines 1 and 2 initialize the CUSUM and an EWMA estimate of the mean inter-arrival time. Starting the EWMA based on the median of an initial sample provides robustness against outliers. Dividing the median by log(2) produces an estimate of the mean. For each new unsolicited scanner packet, Line 4 computes the current CUSUM and Line 5 the current EWMA. No further action is required if the CUSUM is zero. The EWMA parameter w determines the depth of the memory and the relative weight between the current and previous data. Although there is no general rule for the optimal choice of w, in our experiments, performance of the algorithm is similar for various values of w between $10^{-4}$ to $10^{-7}$. Whenever the CUSUM becomes positive, lines 7 and 8 initialize indices used to record the transition and track the local maximum: j is used to track the number of consecutive positive CUSUM's and $S_{max}$ is the local maximum. If the CUSUM remains positive on subsequent steps, then line 10 updates j and $S_{max}$ and line 11 resets the CUSUM to zero if a downtrend is recognized with respect to the local maximum. Line 12 triggers estimation of the propagation rate in lines 13 and 14 if the CUSUM has become large. Lines 15 through 17 test whether the data suggest a significantly large propagation rate with high confidence. If so, the alarm is raised until such time as the CUSUM is reset to zero again.

A trace of the Slammer Worm outbreak was used to test the algorithm. FIG. 4 plots the number of scanners arriving at the firewall every second observed 1,000 seconds surrounding the outbreak of Slammer. The first dashed vertical line 405 marks the time of arrival of the first Slammer scan and the second dashed vertical line 410 marks when the worm detector of the present invention signals a worm outbreak. The average number of unsolicited packets is about 2.5 per second before the first worm scan arrives at time 364 seconds. The alarm is raised at just 16 seconds after the initial Slammer scan and at the time the scanners rate has increased to about 6.5 per second. Scans from Slammer peak at about 600 seconds when almost all vulnerable hosts world-wide have become infected. The algorithm was able to give a warning in as little as 6.7% of the time it took for Slammer to infect all hosts. In the trace, only 60 hosts had been affected before Slammer would have been detected, whereas a total of 72,516 were actually infected in total when the worm was left to propagate naturally.

FIG. 4 is shown only as an example of the functionality of the worm detection algorithm. It illustrates one embodiment of the present invention and is not intended to limit the present invention in any matter.

It should be clear to persons familiar with the related arts that the process, procedures and/or steps of the invention described herein can be performed by a programmed computing device running software designed to cause the computing device to perform the processes, procedures and/or steps described herein. These processes, procedures and/or steps also could be performed by other forms of circuitry including, but not limited to, application-specific integrated circuits, logic circuits, and state machines.

Having thus described a particular embodiment of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of detecting worm propagation, comprising:
using a processor for
identifying unsolicited traffic within traffic in a network;
isolating the unsolicited traffic;
determining an arrival rate of unsolicited traffic based on at least
  a cumulative summing value that indicates unsolicited traffic arrival and
  an exponentially weighted moving average estimate of the arrival rate;
determining whether the cumulative summing value exceeds a selected threshold;
determining a local maximum of the cumulative summing value;
determining whether the cumulative summing value decreases with respect to the local maximum; and
identifying worm propagation based on the cumulative summing value increasing or remaining essentially the same with respect to the local maximum for a plurality of sequential cumulative summing values.

2. The method of claim 1, comprising resetting the cumulative summing value to a preselected value based on a downtrend in the cumulative summing value with respect to the local maximum.

3. The method of claim 1, comprising
determining whether at least the cumulative summing value indicates a large unsolicited traffic propagation rate; and
initiating an alarm condition corresponding to worm propagation.

4. The method of claim 1, comprising identifying worm propagation based on an exponential growth rate in the unsolicited traffic arrival rate.

5. The method of claim 1, wherein the network includes a router and the unsolicited traffic is received at the router.

6. The method of claim 1, comprising identifying worm propagation based on a decrease in an inter-arrival time between unsolicited traffic packets.

7. The method of claim 6, wherein identifying worm propagation is based on the inter-arrival time having a decreasing mean over time.

* * * * *